US012748396B2

(12) United States Patent
Masui et al.

(10) Patent No.: US 12,748,396 B2
(45) Date of Patent: Sep. 29, 2026

(54) MACHINING CONDITION SEARCH DEVICE AND MACHINING CONDITION SEARCH METHOD

(71) Applicant: MITSUBISHI ELECTRIC CORPORATION, Tokyo (JP)

(72) Inventors: Hideyuki Masui, Tokyo (JP); Toshiaki Kurokawa, Tokyo (JP); Tomoaki Takada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 433 days.

(21) Appl. No.: 18/522,354

(22) Filed: Nov. 29, 2023

(65) Prior Publication Data

US 2024/0094688 A1 Mar. 21, 2024

Related U.S. Application Data

(63) Continuation of application No. PCT/JP2021/025722, filed on Jul. 8, 2021.

(51) Int. Cl.
*G05B 13/04* (2006.01)

(52) U.S. Cl.
CPC ......... *G05B 13/048* (2013.01); *G05B 13/042* (2013.01)

(58) Field of Classification Search
USPC ........................................................ 700/29
See application file for complete search history.

(56) References Cited

U.S. PATENT DOCUMENTS

2011/0208354 A1 8/2011 Kato et al.
2019/0137969 A1 5/2019 Watanabe et al.
2022/0107629 A1 4/2022 Masui et al.

FOREIGN PATENT DOCUMENTS

JP 2008-36812 A 2/2008
JP 2008036812 A * 2/2008

(Continued)

OTHER PUBLICATIONS

Indian Office Action and Search Report for Indian Application No. 202427000448, dated Jul. 1, 2025, with English translation.

(Continued)

*Primary Examiner* — Hien D Khuu
(74) *Attorney, Agent, or Firm* — Birch, Stewart, Kolasch & Birch, LLP

(57) ABSTRACT

A machining result processing device includes processing circuitry configured to collect machining result information; calculate a provisional evaluation value for machining performed; estimate an estimated convergence value when the provisional evaluation value has not converged; determine whether to terminate the machining before the provisional evaluation value converges when the provisional evaluation value has not converged; determine the estimated convergence value as an evaluation value when the machining is terminated and determine the convergence value of the provisional evaluation value as an evaluation value after the provisional evaluation value has converged when the machining is not terminated; and determine an optimal machining condition when the search is terminated and generates a machining condition to be tried next when the search is not terminated, in which until it is determined to end the search, each of aforementioned processes described above is repeatedly performed.

11 Claims, 7 Drawing Sheets

(56) References Cited

FOREIGN PATENT DOCUMENTS

| | | | | |
|---|---|---|---|---|
| JP | 2011-192267 | A | | 9/2011 |
| JP | 4795282 | B2 | * | 10/2011 |
| JP | 2013-218725 | A | | 10/2013 |
| JP | 2019-86928 | A | | 6/2019 |
| JP | 6639760 | B1 | * | 2/2020 |
| TW | 202100290 | A | | 1/2021 |
| WO | WO-2020261572 | A1 | * | 12/2020 |

OTHER PUBLICATIONS

International Search Report (PCT/ISA/210) issued in PCT/JP2021/025722 mailed on Oct. 5, 2021.

Notice of Reasons for Refusal of Japan Patent Application No. 2021-569281 mailed Mar. 8, 2022.

Taiwanese Office Action and Search Report for Taiwanese Application No. 110143466, dated May 10, 2024, with an English translation.

* cited by examiner

MACHINING CONDITION SEARCH DEVICE AND MACHINING CONDITION SEARCH METHOD

CROSS REFERENCE TO RELATED APPLICATIONS

This application is a Continuation of PCT International Application No. PCT/JP2021/025722 filed on Jul. 8, 2021, which is hereby expressly incorporated by reference into the present application.

TECHNICAL FIELD

The present disclosure relates to a machining condition search device and a machining condition search method for searching for a machining condition.

BACKGROUND ART

Generally, a plurality of control parameters can be set for a machining apparatus used in industrial applications. The machining result of the machining apparatus depends on a machining condition that is a combination of parameter values of the plurality of control parameters. That is, in order to obtain a desired machining result, it is necessary to set an appropriate machining condition for the machining apparatus.

However, there are more than one control parameter, and the parameter value of each control parameter is a continuous value or can be set in multiple levels. Thus, if a person selects a machining condition that actually causes the machining apparatus to perform machining and obtains a desired machining result, it takes a huge amount of time. For example, in the case of a sheet metal laser machining apparatus, five parameters of laser output, cutting speed, beam diameter, focal position, and gas pressure are exemplified as main control parameters having a large influence on the machining result. One control parameter is selected from values in multiple levels. Here, for example, if each of the five control parameters can be selected from values in 10 levels, the total number of combinations is $10^5$. At this time, if it takes five minutes to try one machining condition, it takes about 347 days to try $10^5$ machining conditions.

Thus, conventionally, there is known a technique of calculating an evaluation value corresponding to a machining condition on the basis of machining results obtained by causing the machining apparatus to perform machining under several machining conditions to be tried generated from among machining conditions of combinations of assumed control parameters, predicting an evaluation value corresponding to an untried machining condition using Gaussian process regression on the basis of the calculated evaluation value and the machining condition corresponding to the evaluation value, and searching for an optimal machining condition from among a huge number of combinations of machining conditions on the basis of the calculated evaluation value and the predicted evaluation value (for example, Patent Literature 1). Examples of a method of using the Gaussian process regression to predict the evaluation value corresponding to the untried machining condition include a method of using a probability model generated on the assumption that the evaluation value for the machining condition is a random variable following a specific distribution.

CITATION LIST

Patent Literature

Patent Literature 1: WO 2020/261572

SUMMARY OF INVENTION

Technical Problem

A machining result obtained when a machining apparatus is caused to perform machining under certain machining conditions may change in a vibratory manner in the course of progress of machining. For example, the machining speed obtained as a machining result changes in a vibratory manner when viewed in a short time even if the machining speed appears to be proceeding at a constant speed when viewed in a long time. When the machining result changes in a vibratory manner, the evaluation value corresponding to the machining result also changes in a vibratory manner.

In the optimal machining condition search technique represented by the technique disclosed in Patent Literature 1, machining is continuously performed by a machining apparatus for a certain period of time until a vibrational change in a machining result settles for each of all the machining conditions to be tried, and an evaluation value corresponding to the machining condition is calculated after the vibrational change in the machining result settles.

Thus, in the above-described search technique, there is a problem that it takes time to calculate an evaluation value corresponding to a machining condition tried, and as a result, it takes time to find an optimal machining condition.

The present disclosure solves the above problems, and an object thereof is to provide a machining condition search device and a machining condition search method capable of shortening the time until an optimal machining condition can be found, as compared with the conventional technique in which a machining apparatus is caused to perform machining under all machining conditions to be tried is performed until a vibrational change in a machining result settles.

Solution to Problem

A machining condition search device according to the present disclosure includes processing circuitry configured to generate a machining condition including a plurality of control parameters settable in a machining apparatus, cause the machining apparatus to perform machining in accordance with the generated machining condition, collect machining result information indicating a machining result of the machining performed by the machining apparatus, calculate at least one provisional evaluation value for the performed machining on the basis of the collected machining result information, the at least one provisional evaluation value including a plurality of provisional evaluation values, determine whether or not the at least one provisional evaluation value has converged on the basis of the calculated provisional evaluation values in time series, and estimate an estimated convergence value to be a convergence destination of the at least one provisional evaluation value when it is determined that the at least one provisional evaluation value has not converged, determine whether or not to terminate the machining under the machining condition being tried before the at least one provisional evaluation value converges when the processing circuitry determines that the at least one provisional evaluation value has not converged, end the machining in accordance with the machining condition for the machining apparatus when the processing circuitry determines to terminate the machining under the machining condition being tried and determine the estimated convergence value as an evaluation value of the machining performed in accordance with the machining condition, and determine, when the processing circuitry determines not to terminate the machining under the machining condition being tried, a convergence value of the at least one provisional evaluation value as the evaluation value after it is determined that the at least one provisional evaluation value has converged, predict a prediction value of the evaluation value corresponding to the machining condition untried on the basis of the determined evaluation value and the machining condition corresponding to the evaluation value, and determine whether or not to end a search for the machining condition, determine the machining condition that is optimum on the basis of the determined evaluation value when ending the search, and generate the machining condition to be tried next on the basis of the prediction value when not ending the search, and until the processing circuitry determines to end the search, the processing circuitry repeatedly performs each of aforementioned processes.

Advantageous Effects of Invention

According to the present disclosure, when searching for an optimal machining condition, it is possible to shorten the time until an optimal machining condition can be found as compared with the conventional technique in which machining under the machining condition is performed until a vibrational change in the machining result settles in the machining apparatus for all the machining conditions to be tried.

DESCRIPTION OF EMBODIMENTS

First Embodiment

Figure 1:
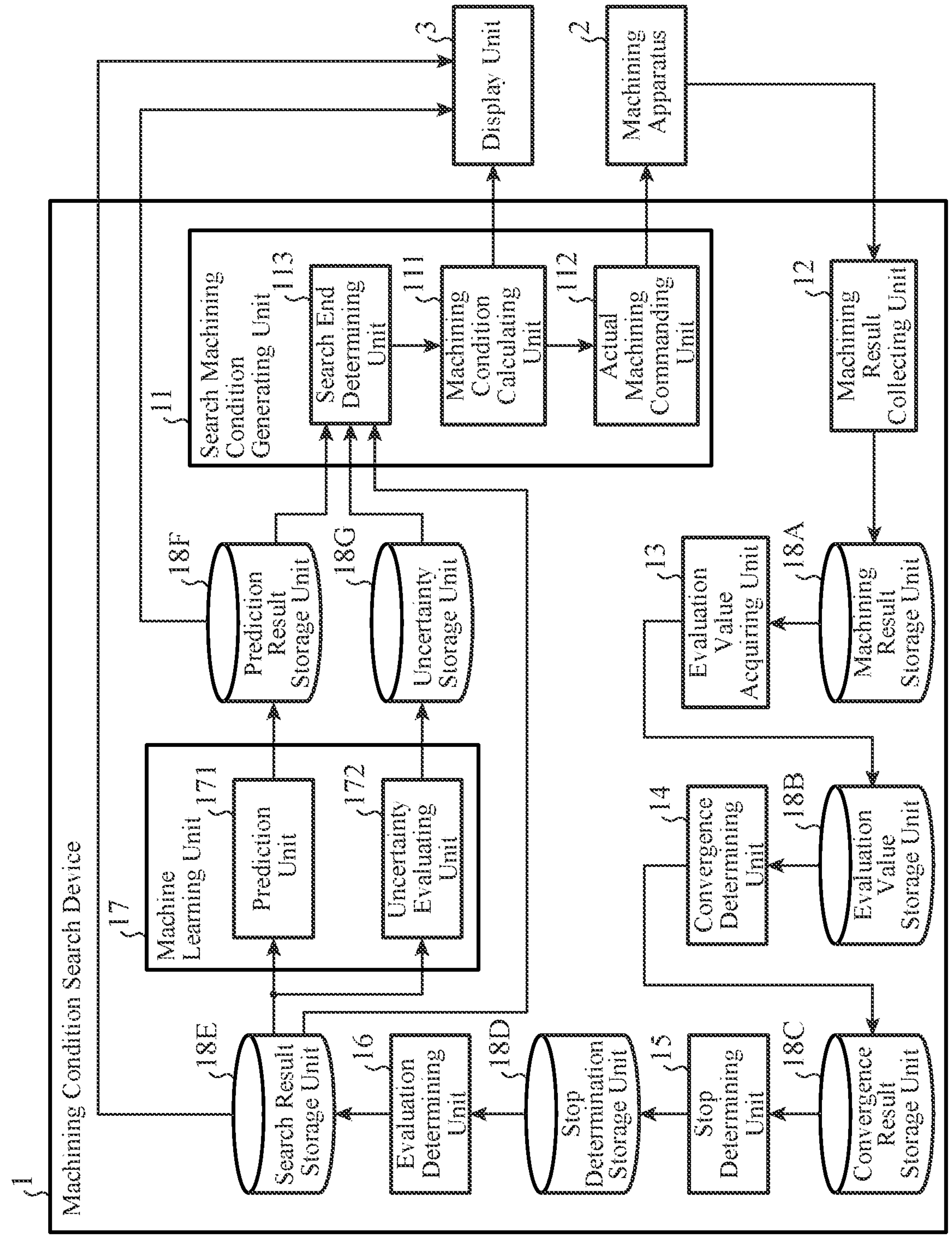
FIG. 1 is a diagram illustrating a configuration example of a machining condition search device according to a first embodiment.

FIG. 1 is a diagram illustrating a configuration example of a machining condition search device 1 according to a first embodiment.

The machining condition search device 1 according to the first embodiment is connected to a machining apparatus 2 and a display unit 3. The machining condition search device 1 searches for an optimal machining condition (hereinafter referred to as "optimal machining conditions") from a large number of machining conditions that can be set in the machining apparatus 2. The optimal machining condition is, for example, a machining condition under which a machining result satisfying requested specifications of machining is obtained. Further, the display unit 3 displays the machining conditions and the like found by the machining condition search device 1 in accordance with a request from a user such as a machining worker. For example, the display unit 3 displays machining conditions set in the machining apparatus 2 and evaluation values of machining performed by the machining apparatus 2 in accordance with the machining conditions. Further, for example, the display unit 3 displays a machining condition that is not performed by the machining apparatus 2 and a prediction value of an evaluation value of machining when it is assumed that the machining apparatus 2 performs machining in accordance with the machining condition. In addition, for example, an optimal machining condition that is a search result of a search by the machining condition search device 1 is displayed. Note that, in FIG. 1, the display unit 3 is provided outside the machining condition search device 1 and the machining apparatus 2, but this is merely an example. The display unit 3 may be provided in, for example, the machining condition search device 1 or the machining apparatus 2.

The machining apparatus 2 is an industrial device that performs machining in accordance with machining conditions. For example, the machining apparatus 2 forms a manufactured article as a workpiece into a desired shape by removing unnecessary portions. The machining apparatus 2 can also perform, for example, additive machining. Hereinafter, the manufactured article is referred to as a workpiece. The material of the workpiece is, for example, metal. Note that this is merely an example, and the material of the workpiece is not limited to metal. The material of the workpiece may be, for example, ceramic, glass, or wood.

Examples of the machining apparatus 2 include a laser machining apparatus, an electrical discharge machining apparatus, a cutting machining apparatus, a grinding machining apparatus, an electrolytic machining apparatus, an ultrasonic machining apparatus, an electron beam machining apparatus, and an additional machining apparatus. In the following first embodiment, as an example, the machining apparatus 2 is assumed to be a laser machining apparatus. Note that this is merely an example, and in the first embodiment, the machining apparatus 2 may be a machining apparatus other than the laser machining apparatus.

The machining apparatus 2 can perform normal machining for forming the workpiece into a desired shape, and can perform experimental machining on the workpiece.

In the experimental machining, the machining condition search device 1 according to the first embodiment generates a trial machining condition, and causes the machining apparatus 2 to perform the experimental machining in accordance with the machining condition. The machining apparatus 2 performs preset experimental machining on the workpiece in accordance with the machining conditions described above.

Here, the machining conditions are configured by a combination of a plurality of control parameters used for controlling the machining apparatus 2. The control parameters are, for example, laser power, cutting speed, beam diameter, focal position, and gas pressure. Each control parameter included in the machining conditions can be adjusted. For example, when there are five control parameters that can be adjusted in machining of the laser machining apparatus, and the value of each control parameter can be selected in 10 levels, there are $10^5=100000$ machining conditions configured by a combination of each control parameter.

The machining condition search device 1 generates a trial machining condition for search from such a huge number of combinations of machining conditions, and causes the machining apparatus 2 to perform experimental machining. When the machining apparatus 2 performs the experimental machining in accordance with the machining conditions, the machining condition search device 1 collects information indicating machining results (hereinafter referred to as "machining result information") from the machining apparatus 2. The machining result information is, for example, information indicating the state of the machining apparatus 2 during machining, information indicating the state of the workpiece during machining, or information indicating the state of the workpiece after machining. The machining result information also includes information on machining conditions according to which the machining apparatus 2 has performed machining.

For example, the machining apparatus 2 includes a sensor that detects sound, light, or a machining speed generated during machining, and the machining condition search device 1 collects machining result information from the sensor. For example, the sensor may be an imaging device that acquires an image obtained by imaging the workpiece after machining, or a measuring instrument that measures unevenness of a cut surface of the workpiece. Further, the sensor may be provided at a location different from the machining apparatus 2. The machining condition search device 1 only needs to be able to collect the machining result information.

The machining condition search device 1 determines an evaluation value of machining performed in accordance with a machining condition on the basis of machining result information collected by performing machining in accordance with the machining condition. Then, the machining condition search device 1 searches for an optimal machining condition while predicting an evaluation value corresponding to an untried machining condition on the basis of a combination of the machining condition and the evaluation value. Details of a method by which the machining condition search device 1 searches for the optimal machining condition will be described later.

Here, as described above, the machining result obtained when the machining apparatus 2 is caused to perform machining under a certain machining condition may change in a vibratory manner as the machining proceeds. When the machining result changes in a vibratory manner, the evaluation value corresponding to the machining result calculated on the basis of the machining result also changes in a vibratory manner. If the machining condition search device 1 causes the machining apparatus 2 to perform machining for a certain amount of time until the vibrational change in the machining result in accordance with each machining condition settles for all the machining conditions to be tried, and waits for the vibrational change in the machining result to settle, it takes time to calculate the evaluation value corresponding to each machining condition.

Accordingly, the machining condition search device 1 according to the first embodiment employs the evaluation value calculated in the process until the vibrational change of the machining result settles for the search for the optimal machining condition even if the evaluation value is an evaluation value before the vibrational change settles as long as the evaluation value is assumed to have no influence on the search for the optimal machining condition, terminates the machining in the experiment in accordance with the machining condition being tried, and switches the machining condition for the search. Thus, the machining condition search device 1 according to the first embodiment shortens the time until an optimal machining condition can be found.

A detailed configuration example of the machining condition search device 1 according to the first embodiment will be described.

The machining condition search device 1 includes a search machining condition generating unit 11, a machining result collecting unit 12, an evaluation value acquiring unit 13, a convergence determining unit 14, a stop determining unit 15, an evaluation determining unit 16, and a machine learning unit 17. Further, the machining condition search device 1 also includes a machining result storage unit 18A, an evaluation value storage unit 18B, a convergence result storage unit 18C, a stop determination storage unit 18D, a search result storage unit 18E, a prediction result storage unit 18F, and an uncertainty storage unit 18G. Note that all or some of the storage units 18A to 18G may be provided by an external device provided separately from the machining condition search device 1.

The search machining condition generating unit 11 generates machining conditions to be used in experimental actual machining, and causes the machining apparatus 2 to perform machining in accordance with the generated machining conditions. That is, the search machining condition generating unit 11 generates a machining condition to be searched for by actual machining in a multidimensional space having control parameters constituting the machining condition as dimensions. As illustrated in FIG. 1, the search machining condition generating unit 11 includes a machining condition calculating unit 111, an actual machining commanding unit 112, and a search end determining unit 113.

The machining condition calculating unit 111 of the search machining condition generating unit 11 generates a machining condition including a plurality of control parameters that can be set in the machining apparatus 2. Specifically, the machining condition calculating unit 111 generates machining conditions to be used in the experimental machining. For example, the machining condition calculating unit 111 selects a combination corresponding to the machining content from combinations of a plurality of control parameters of the machining apparatus 2 and a range of values that can be taken by these control parameters, and generates the machining condition from the selected combination. The control parameters are, for example, laser power, cutting speed, beam diameter, focal position, and gas pressure.

The machining condition calculating unit 111 outputs the generated machining condition to the actual machining commanding unit 112.

The actual machining commanding unit 112 causes the machining apparatus 2 to perform machining in accordance with the machining conditions generated by the machining condition calculating unit 111. Note that the actual machining commanding unit 112 causes the machining apparatus 2 to continuously perform machining in accordance with the machining conditions generated by the machining condition calculating unit 111. Specifically, the actual machining commanding unit 112 generates a command for operating the machining apparatus 2 in accordance with the machining conditions output from the machining condition calculating unit 111, and outputs the generated command to the machining apparatus 2. The machining apparatus 2 performs machining in accordance with the machining conditions on the basis of the command output from the actual machining commanding unit 112.

Further, when the evaluation determining unit 16 outputs an instruction to end machining under the machining condition being tried (hereinafter referred to as a "machining end instruction"), the actual machining commanding unit 112 ends experimental machining that is currently being performed on the machining apparatus 2. Details of the evaluation determining unit 16 will be described later.

The search end determining unit 113 determines whether or not to end the search for the machining condition on the basis of the information stored in the prediction result storage unit 18F or the uncertainty storage unit 18G.

When it is determined that it is not necessary to additionally search for a machining condition, the search end determining unit 113 determines an optimal machining condition on the basis of the evaluation value determined by the evaluation determining unit 16. Specifically, the search end determining unit 113 sets the machining condition corresponding to the highest evaluation value among the evaluation values stored in the search result storage unit 18E as the optimal machining condition. Details of the evaluation determining unit 16 will be described later.

Further, when it is determined that it is necessary to additionally search for a machining condition, the search end determining unit 113 causes the machining condition calculating unit 111 to generate a machining condition for search to be tried next.

The machining result collecting unit 12 collects, from the machining apparatus 2, machining result information indicating a machining result of machining performed in accordance with the machining conditions.

The machining result collecting unit 12 collects a machining result every time the actual machining commanding unit 112 causes machining to be performed. As described above, the actual machining commanding unit 112 causes the machining to be performed continuously in accordance with the machining conditions. While the machining apparatus 2 performs the machining, machining is performed in a plurality of steps. Therefore, when the machining apparatus 2 performs experimental machining in accordance with certain machining conditions, a plurality of pieces of machining result information is collected.

The machining result collecting unit 12 causes the machining result storage unit 18A to store the collected machining result information. The machining result collecting unit 12 causes the machining result storage unit 18A to store the machining result information in association with the acquisition time of the machining result information, for example.

The machining result storage unit 18A stores the machining result information in time series.

The evaluation value acquiring unit 13 calculates an evaluation value for machining performed by the machining apparatus 2 on the basis of the machining result information collected by the machining result collecting unit 12. In the first embodiment, the evaluation value calculated by the evaluation value acquiring unit 13 on the basis of the machining result information is also referred to as a "provisional evaluation value". The evaluation value acquiring unit 13 calculates a provisional evaluation value for each piece of the machining result information. That is, the evaluation value acquiring unit 13 calculates a provisional evaluation value for each machining step. Note that the evaluation value acquiring unit 13 acquires the machining result information collected by the machining result collecting unit 12 from the machining result storage unit 18A.

In the first embodiment, the evaluation value is a value indicating the quality of machining, and is defined as a value indicating that the larger the value, the better the machining. The evaluation value is indicated by, for example, a value from 0 to 1. In this case, the evaluation value is 1 when the best machining is performed, and the evaluation value is 0 when the worst machining is performed.

The evaluation value acquiring unit 13 causes the evaluation value storage unit 18B to store information (hereinafter referred to as "provisional evaluation value information") in which the acquisition time of the machining result information, the machining condition, and the calculated provisional evaluation value are associated with each other. Note that, here, in the provisional evaluation value information, the acquisition time of the machining result information is associated with the machining condition and the provisional evaluation value, but this is merely an example. For example, in the provisional evaluation value information, the calculation time of the provisional evaluation value may be associated with the machining condition and the provisional evaluation value.

The evaluation value storage unit 18B stores the provisional evaluation value information in time series.

The convergence determining unit 14 determines whether or not the provisional evaluation value has converged on the basis of provisional evaluation values in time series calculated by the evaluation value acquiring unit 13. In the first embodiment, "convergence" means that there is no vibrational change in value. The convergence determining unit 14 determines whether the provisional evaluation value has converged for each machining condition. Note that the convergence determining unit 14 acquires the provisional evaluation values in time series calculated by the evaluation value acquiring unit 13 from the provisional evaluation value information stored in the evaluation value storage unit 18B.

When it is determined that the provisional evaluation value has converged, the convergence determining unit 14 causes the convergence result storage unit 18C to store, as post-convergence determination information, information in which the acquisition time of the machining result information, information indicating that the provisional evaluation value has converged, the machining condition, the provisional evaluation value, and a convergence value of the provisional evaluation value are associated with each other. Instead of the acquisition time of the machining result information, the calculation time of the provisional evaluation values may be associated. For example, the convergence determining unit 14 sets the latest provisional evaluation value as a convergence value of the provisional evaluation value. Note that this is merely an example, and for example, information (hereinafter referred to as "convergence value calculation information") defining how to calculate the convergence value of the provisional evaluation value on the basis of the provisional evaluation values in time series is determined in advance, and the convergence determining unit 14 may calculate the convergence value of the provisional evaluation value on the basis of the convergence value calculation information.

On the other hand, when it is determined that the provisional evaluation value has not converged, the convergence determining unit 14 estimates a value (hereinafter referred to as an "estimated convergence value") to be a convergence destination of the provisional evaluation value. Then, the convergence determining unit 14 causes the convergence result storage unit 18C to store, as post-convergence determination information, information in which the acquisition time of the machining result information, information indicating that the provisional evaluation value has not converged, the machining condition, the provisional evaluation value, and the estimated convergence value are associated with one another. Instead of the acquisition time of the machining result information, the calculation time of the provisional evaluation values may be associated.

When the convergence determining unit 14 determines that the provisional evaluation value has not converged, the stop determining unit 15 determines whether or not to terminate the machining under the machining condition being tried before the provisional evaluation value converges. The stop determining unit 15 determines whether or not to terminate machining under the machining condition being tried for each machining condition. Note that the stop determining unit 15 only needs to determine that the convergence determining unit 14 has determined that the provisional evaluation value has not converged from the post-convergence determination information stored in the convergence result storage unit 18C. The stop determining unit 15 may directly acquire information indicating that it is determined that the provisional evaluation value has not converged from the convergence determining unit 14. Note that, in FIG. 1, arrows from the convergence determining unit 14 to the stop determining unit 15 are omitted.

The stop determining unit 15 causes the stop determination storage unit 18D to store information (hereinafter referred to as "post-termination determination information") in which the determination result (hereinafter referred to as a "termination determination result") as to whether or not to terminate machining under the machining condition being tried is associated with the latest post-convergence determination information output from the convergence determining unit 14.

The stop determination storage unit 18D stores the post-termination determination information.

When the stop determining unit 15 determines to terminate the machining under the machining condition being tried, the evaluation determining unit 16 causes the actual machining commanding unit 112 to terminate the machining in accordance with the machining condition for the machining apparatus 2, and determines the estimated convergence value estimated by the convergence determining unit 14 as the evaluation value of the machining performed in accordance with the machining condition. When the stop determining unit 15 determines not to terminate the machining under the machining condition being tried, the convergence determining unit 14 determines that the provisional evaluation value has converged, and thereafter the evaluation determining unit 16 determines the convergence value of the provisional evaluation value as the evaluation value of the machining performed in accordance with the machining condition. Note that the evaluation determining unit 16 determines, for each machining condition, an evaluation value for machining performed in accordance with the machining condition.

The evaluation determining unit 16 only needs to specify whether or not the stop determining unit 15 has determined to terminate machining under the machining condition being tried, the estimated convergence value estimated by the convergence determining unit 14, or the convergence value of the provisional evaluation value, from the post-termination determination information stored in the stop determination storage unit 18D. For example, the evaluation determining unit 16 may directly acquire the post-termination determination information from the stop determining unit 15. Note that, in FIG. 1, arrows from the stop determining unit 15 to the evaluation determining unit 16 are omitted.

The evaluation determining unit 16 causes the search result storage unit 18E to store the combination of the machining condition and the evaluation value as a search result.

The search result storage unit 18E stores the search result.

The machine learning unit 17 predicts an evaluation value of machining corresponding to an untried machining condition (machining is not performed) using the search result stored in the search result storage unit 18E. Further, the machine learning unit 17 calculates uncertainty with respect to the prediction value of the evaluation value, that is, the likelihood of deviation of the prediction.

The machine learning unit 17 includes a prediction unit 171 and an uncertainty evaluating unit 172.

The prediction unit 171 predicts an evaluation value corresponding to an untried machining condition on the basis of the evaluation value determined by the evaluation determining unit 16 and the machining condition corresponding to the evaluation value. The prediction unit 171 only needs to acquire the evaluation value determined by the evaluation determining unit 16 and the machining condition corresponding to the evaluation value from the search result stored in the search result storage unit 18E.

The prediction unit 171 causes the prediction result storage unit 18F to store information (hereinafter referred to as "prediction result information") in which the prediction value of the evaluation value obtained by the prediction is associated with the machining condition. The prediction result information is information in which an untried machining condition is associated with a prediction value of an evaluation value corresponding thereto.

The prediction result storage unit 18F stores prediction result information.

The uncertainty evaluating unit 172 calculates an index indicating the uncertainty of the prediction of the evaluation value by the prediction unit 171. The uncertainty evaluating unit 172 calculates an index indicating uncertainty of the evaluation value with respect to the prediction value, that is, a likelihood of deviation of the prediction by using the search result stored in the search result storage unit 18E. The uncertainty evaluating unit 172 causes the uncertainty storage unit 18G to store information (hereinafter referred to as "uncertainty information") in which the calculated value of the index is associated with the machining condition. The uncertainty information is information in which an untried machining condition is associated with an index value indicating uncertainty of prediction of an evaluation value corresponding to the untried machining condition.

The uncertainty storage unit 18G stores uncertainty information.

Next, the operation of the machining condition search device 1 according to the first embodiment will be described.

Figure 2:
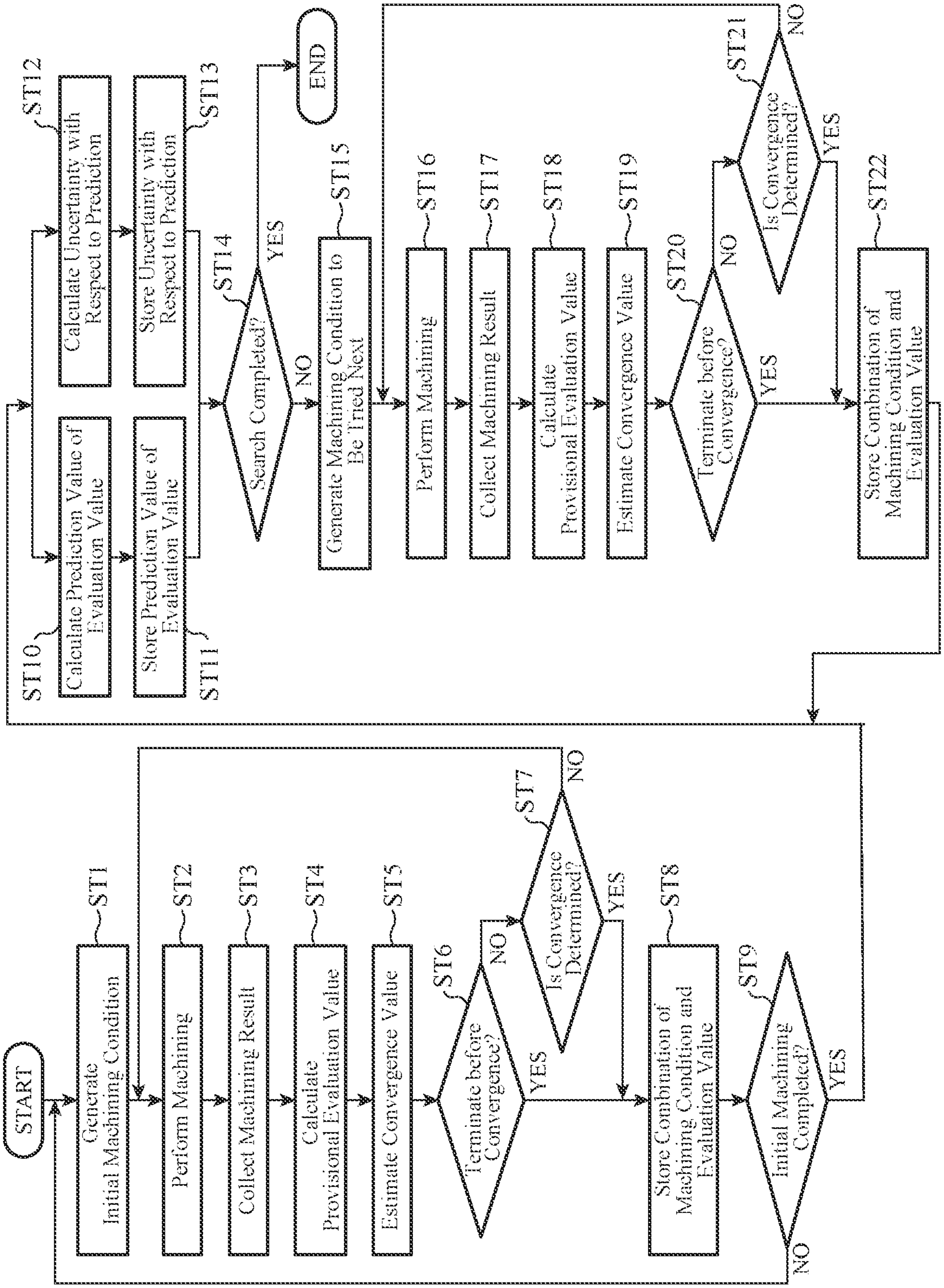
FIG. 2 is a flowchart for describing an operation of the machining condition search device according to the first embodiment.

FIG. 2 is a flowchart for describing the operation of the machining condition search device 1 according to the first embodiment.

When the machining condition search process is started, first, the machining condition calculating unit 111 of the search machining condition generating unit 11 generates an initial machining condition (step ST1). The machining condition calculating unit 111 generates the initial machining condition by selecting a predetermined number of machining conditions as initial machining conditions from among all combinations that can be set as machining conditions. Examples of a method of selecting the initial machining condition by the machining condition calculating unit 111 include an experimental planning method, an optimal planning method, and random sampling. In addition, in a case where the user has an idea of a machining condition that is considered to be optimal from past use results or the like, the machining condition calculating unit 111 may use the machining condition input from the user as the initial machining condition. Note that these methods are merely examples, and the machining condition calculating unit 111 may use any method to generate the initial machining conditions.

For example, when the number of control parameters constituting the machining conditions is five, and a value to be set in the machining apparatus 2 can be selected from values in 10 levels for each control parameter, the total number of combinations of the machining conditions is $10^5=100000$. The machining condition calculating unit 111 selects, for example, 10 machining conditions as initial machining conditions from these combinations. Note that the number of control parameters constituting the machining conditions, the number of levels that can be set for each control parameter, or the number of machining conditions selected as the initial machining conditions is not limited thereto. The number of levels that can be set may be different depending on the control parameter.

Next, the machining condition search device 1 selects one initial machining condition from the initial machining conditions generated by the machining condition calculating unit 111, and causes the machining apparatus 2 to perform machining under the selected initial machining condition (step ST2). Specifically, the machining condition calculating unit 111 selects one of the initial machining conditions and outputs the selected initial machining condition to the actual machining commanding unit 112 of the search machining condition generating unit 11. The actual machining commanding unit 112 generates a command for operating the machining apparatus 2 on the basis of the initial machining condition output from the machining condition calculating unit 111, and outputs the generated command to the machining apparatus 2. Thus, the machining apparatus 2 performs machining based on the initial machining condition selected by the machining condition calculating unit 111. As described above, the machining condition search device 1 according to the first embodiment first causes the machining apparatus 2 to perform machining based on the initial machining condition. Hereinafter, the machining based on the initial machining condition is also referred to as "initial machining".

The machining result collecting unit 12 collects, from the machining apparatus 2, machining result information indicating the machining result of the initial machining performed according to the initial machining condition (step ST3).

The machining result collecting unit 12 causes the machining result storage unit 18A to store the collected machining result information.

The evaluation value acquiring unit 13 calculates a provisional evaluation value for machining performed by the machining apparatus 2 in accordance with the initial machining conditions in step ST2 on the basis of the machining result information collected by the machining result collecting unit 12 (step ST4).

The evaluation value acquiring unit 13 causes the evaluation value storage unit 18B to store the provisional evaluation value information in which the acquisition time of the machining result information, the machining condition, here, the initial machining condition, and the calculated provisional evaluation value are associated with each other.

The convergence determining unit 14 determines whether or not the provisional evaluation value has converged on the basis of the provisional evaluation values in time series calculated by the evaluation value acquiring unit 13. When it is determined that the provisional evaluation value has converged, the convergence determining unit 14 causes the convergence result storage unit 18C to store the post-convergence determination information in which the acquisition time of the machining result information, the information indicating that the provisional evaluation value has converged, the machining condition, here, the initial machining condition, the provisional evaluation value, and the convergence value of the provisional evaluation value are associated with one another. On the other hand, when it is determined that the provisional evaluation value has not converged, the convergence determining unit 14 estimates the estimated convergence value, and causes the convergence result storage unit 18C to store the post-convergence determination information in which the acquisition time of the machining result information, the information indicating that the provisional evaluation value has not converged, the machining condition, here, the initial machining condition, the provisional evaluation value, and the estimated convergence value are associated with each other (step ST5).

Here, a method for determining, by the convergence determining unit 14 in step ST5, whether or not the provisional evaluation value has converged based on the provisional evaluation values in time series, and a method for estimating the estimated convergence value in a case where it is determined that the provisional evaluation value has not converged will be described with specific examples.

The convergence determining unit 14 determines whether the provisional evaluation value has converged and estimates a determination estimated convergence value on the basis of, for example, the degree of variation in the provisional evaluation values in time series.

As a specific example, for example, the convergence determining unit 14 obtains a quartile range of the provisional evaluation values from the provisional evaluation values in time series. Then, the convergence determining unit 14 determines whether or not the provisional evaluation value has converged on the basis of the value range of the quartile range of the provisional evaluation values. For example, a value range (hereinafter referred to as a "first convergence determination range") in a case where it is determined that the provisional evaluation value has converged is determined in advance. If the quartile range of the provisional evaluation values falls within the first convergence determination range, the convergence determining unit 14 determines that the provisional evaluation value has converged. If the quartile range of the provisional evaluation values is not within the first convergence determination range, the convergence determining unit 14 determines that the provisional evaluation value has not converged.

When it is determined that the provisional evaluation value has not converged, the convergence determining unit 14 then estimates an estimated convergence value from the quartile range of the provisional evaluation values obtained from the provisional evaluation values in time series. For example, the convergence determining unit 14 estimates the median of the quartile range of the provisional evaluation values as the estimated convergence value.

As another specific example, for example, the convergence determining unit 14 may estimate a distribution by regarding the provisional evaluation values in time series as a specific distribution, and determine whether or not the provisional evaluation value has converged on the basis of how much a value in a section of the average value $\pm\kappa\sigma$ of the provisional evaluation value is in the distribution of the provisional evaluation value. For example, a value range (hereinafter referred to as a "second convergence determination range") in a case where it is determined that the provisional evaluation value has converged is determined in advance. If the value in the section of the average value $\pm\kappa\sigma$ of the provisional evaluation value in the distribution of the provisional evaluation value falls within the second convergence determination range, the convergence determining unit 14 determines that the provisional evaluation value has converged. If the value in the section of the average value $\pm\kappa\sigma$ of the provisional evaluation value in the distribution of the provisional evaluation value is not within the second convergence determination range, the convergence determining unit 14 determines that the provisional evaluation value has not converged.

When it is determined that the provisional evaluation value has not converged, the convergence determining unit 14 then estimates an estimated convergence value from the distribution estimated from the provisional evaluation values in time series. For example, the convergence determining unit 14 estimates the average value of the provisional evaluation value as the estimated convergence value.

In addition, for example, the convergence determining unit 14 may estimate the estimated convergence value on the basis of a learned model (hereinafter referred to as a "first machine learning model") that receives the evaluation values in time series as inputs and outputs the estimated convergence value. The convergence determining unit 14 inputs the provisional evaluation values in time series to the first machine learning model to obtain the estimated convergence value.

In addition, for example, the first machine learning model may be a model that outputs information regarding the degree of variation of the provisional evaluation values in addition to the estimated convergence value. The convergence determining unit 14 may determine whether or not the provisional evaluation value has converged on the basis of information regarding the degree of variation of the provisional evaluation values obtained by inputting the provisional evaluation values in time series to the first machine learning model.

When the convergence determining unit 14 determines that the provisional evaluation value has not converged, the stop determining unit 15 determines whether or not to terminate machining under the initial machining condition being tried before the provisional evaluation value converges (step ST6).

Here, a method of determining, by the stop determining unit 15, whether or not to terminate machining under the machining condition being tried before the provisional evaluation value converges will be described with a specific example.

The stop determining unit 15 determines whether or not to terminate machining under the machining condition being tried before the provisional evaluation value converges, for example, by comparing the degree of variation in the provisional evaluation values in time series calculated by the evaluation value acquiring unit 13 and stored in the evaluation value storage unit 18B with a threshold (hereinafter referred to as a "termination threshold").

The termination threshold is specified in advance by the user, for example, and is stored in the stop determining unit 15. For example, the user designates in advance, as the termination threshold, an evaluation value (hereinafter referred to as a "reference evaluation value") serving as a reference for terminating the machining under the machining condition being tried in a case where the evaluation value does not exceed the evaluation value. For example, the user sets the reference evaluation value depending on requested performance desired for the machining apparatus 2.

As a specific example, for example, when the convergence determining unit 14 obtains the quartile range of the provisional evaluation values from the provisional evaluation values in time series, the stop determining unit 15 determines whether or not to terminate the machining under the machining condition being tried by comparing the largest provisional evaluation value among the provisional evaluation values within the quartile range with the termination threshold. In this case, the stop determining unit 15 determines to terminate the machining under the machining condition being tried if the largest provisional evaluation value among the provisional evaluation values within the quartile range is less than the termination threshold. On the other hand, when the largest provisional evaluation value among the provisional evaluation values within the quartile range is equal to or more than the termination threshold, the stop determining unit 15 determines to continue the machining under the machining condition being tried.

Figure 3:
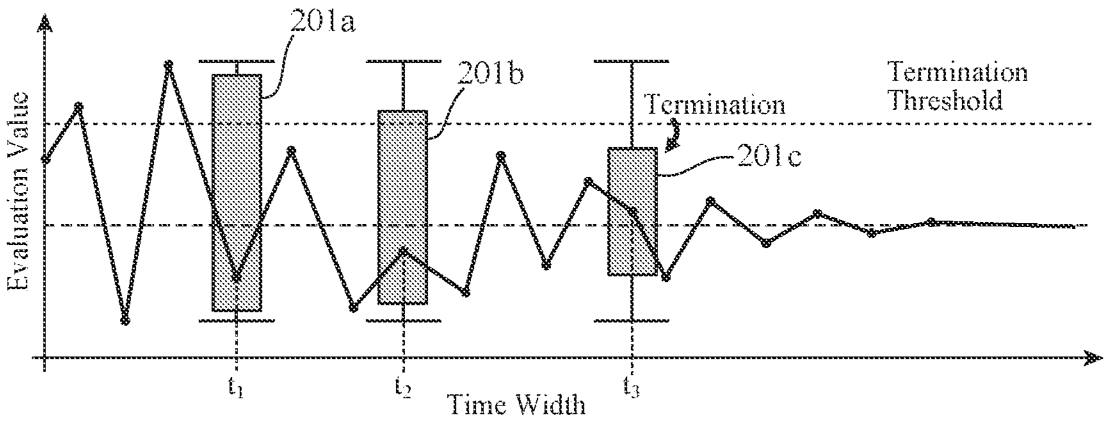
FIG. 3 is a concept diagram of a method example in which a stop determining unit determines whether or not to terminate machining under a machining condition being tried by comparing the largest provisional evaluation value among provisional evaluation values within a quartile range with a termination threshold in the first embodiment.

FIG. 3 is a concept diagram of a method example in which the stop determining unit 15 determines whether or not to terminate machining under a machining condition being tried by comparing the largest provisional evaluation value among the provisional evaluation values within the quartile range with a termination threshold in the first embodiment.

The horizontal axis in FIG. 3 represents a time width in which machining is performed in accordance with a certain machining condition, and the vertical axis in FIG. 3 represents an evaluation value (provisional evaluation value). Points indicated by black circles in FIG. 3 indicate provisional evaluation values calculated on the basis of machining results of machining performed in accordance with the machining conditions. Note that FIG. 3 illustrates a state in which the provisional evaluation value converges for ease of understanding. In FIG. 3, reference numerals 201*a*, 201*b*, and 201*c* denote the quartile range of the provisional evaluation values.

The quartile range of the provisional evaluation values is the range indicated by 201*a* at the time point when $t_1$ hours have elapsed, and the quartile range of the provisional evaluation values is the range indicated by 201*b* at the time point when $t_2$ hours have elapsed. For the quartile ranges illustrated in 201*a* and 201*b*, the largest provisional evaluation value among the provisional evaluation values within the quartile range is equal to or more than the termination threshold. Therefore, in this case, the stop determining unit 15 determines to continue machining under the machining condition being tried.

When $t_3$ hours have elapsed, the quartile range of the provisional evaluation values is a range indicated by 201*c*, and the largest provisional evaluation value among the provisional evaluation values within the quartile range is less than the termination threshold. In this case, the stop determining unit 15 determines to terminate the machining under the machining condition being tried.

As another specific example, for example, when the convergence determining unit 14 estimates the distribution of the provisional evaluation values in time series, the stop determining unit 15 may determine whether or not to terminate machining under the machining condition being tried by comparing the provisional evaluation value included in the section of the average value $\pm\kappa\sigma$ of the provisional evaluation values with the termination threshold. In this case, when all the provisional evaluation values included in the section of the average value $\pm\kappa\sigma$ of the provisional evaluation values are less than the termination threshold, the stop determining unit 15 determines to terminate the machining under the machining condition being tried. On the other hand, when all the provisional evaluation values included in the section of the average value $\pm\kappa\sigma$ of the provisional evaluation values are not less than the termination threshold, the stop determining unit 15 determines to continue the machining under the machining condition being tried.

Figure 4:
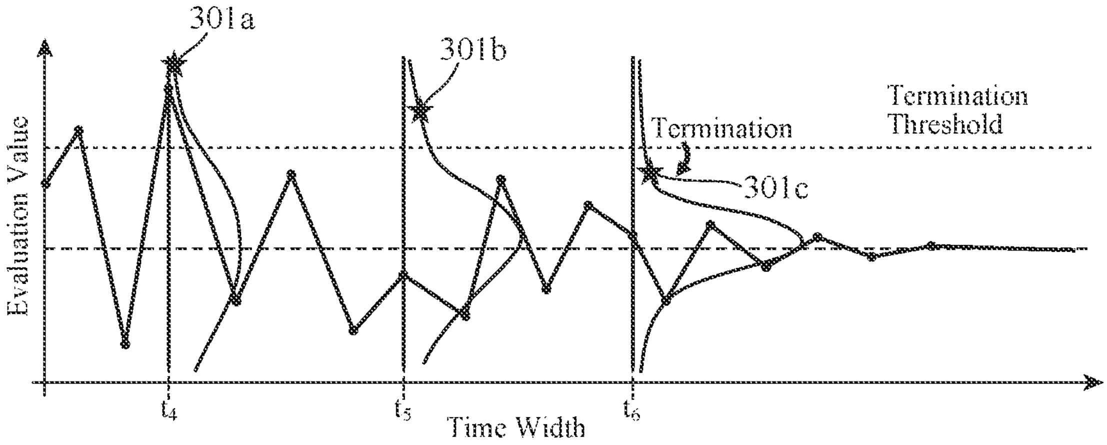
FIG. 4 is a concept diagram of a method example in which the stop determining unit determines whether or not to terminate machining under a machining condition being tried by comparing a provisional evaluation value included in a section of an average value $\pm\kappa\sigma$ of provisional evaluation values with the termination threshold in the first embodiment.

FIG. 4 is a concept diagram of a method example in which the stop determining unit 15 determines whether or not to terminate machining under a machining condition being tried by comparing a provisional evaluation value included in a section of the average value $\pm\kappa\sigma$ of provisional evaluation values with the termination threshold in the first embodiment.

The horizontal axis in FIG. 4 represents a time width in which machining is performed in accordance with a certain machining condition, and the vertical axis in FIG. 4 represents an evaluation value (provisional evaluation value). Points indicated by black circles in FIG. 4 indicate provisional evaluation values calculated on the basis of machining results of machining performed in accordance with a machining condition. Note that FIG. 4 illustrates a state in which the provisional evaluation value converges for ease of understanding. In FIGS. 4, 301*a*, 301*b*, and 301*c* represent the largest provisional evaluation values among the provisional evaluation values included in the interval of the average value $\pm\kappa\sigma$ of the provisional evaluation values.

The largest provisional evaluation value among the provisional evaluation values included in the section of the average value $\pm\kappa\sigma$ of the provisional evaluation values at the time point after $t_4$ hours is a value indicated by 301*a*, and the largest provisional evaluation value among the provisional evaluation values included in the section of the average value $\pm\kappa\sigma$ of the provisional evaluation values at the time point $t_5$ hours is a value indicated by 301*b*. Both the value indicated by 301*a* and the value indicated by 301*b* are equal to or more than the termination threshold. That is, all the provisional evaluation values included in the section of the average value $\pm\kappa\sigma$ of the provisional evaluation values including the value indicated by 301*a* are not less than the termination threshold. Further, all the provisional evaluation values included in the section of the average value $\pm\kappa\sigma$ of the provisional evaluation values including the value indicated by 301*b* are not less than the termination threshold. Therefore, in this case, the stop determining unit 15 determines to continue machining under the machining condition being tried.

When to hours have elapsed, the largest provisional evaluation value among the provisional evaluation values included in the section of the average value $\pm\kappa\sigma$ of the provisional evaluation values is a value indicated by 301*c*. A value indicated by 301*c* is less than the termination threshold. That is, all the provisional evaluation values within the section of the average value $\pm\kappa\sigma$ of the provisional evaluation values including the value indicated by 301*c* are less than the termination threshold. In this case, the stop determining unit 15 determines to terminate the machining under the machining condition being tried.

Furthermore, for example, the stop determining unit 15 can also determine whether or not to terminate machining under the machining condition being tried before the provisional evaluation value converges on the basis of a learned model (hereinafter referred to as a "second machine learning model") that receives the evaluation values in time series as an input and outputs information indicating whether or not to stop machining. The stop determining unit 15 inputs the provisional evaluation values in time series calculated by the evaluation value acquiring unit 13 to the second machine learning model to obtain information indicating whether or not to stop machining. Note that the stop determining unit 15 only needs to acquire the provisional evaluation values in time series calculated by the evaluation value acquiring unit 13 from, for example, post-convergence determination information stored in the convergence result storage unit 18C.

Even if the provisional evaluation value does not converge, if the provisional evaluation value is substantially within a low value range when the degree of variation of the provisional evaluation values in time series is observed, it is assumed that a high provisional evaluation value cannot be obtained even when the machining apparatus 2 continues the machining, in other words, the obtained evaluation value is low. Accordingly, in a case where the stop determining unit 15 determines that the provisional evaluation value substantially fall within the low value range from the degree of variation of the provisional evaluation values in time series by, for example, the method as described above, the stop determining unit determines to terminate the machining under the machining condition being tried even before the provisional evaluation value converges.

The stop determining unit 15 causes the stop determination storage unit 18D to store the post-termination determination information in which the termination determination result is associated with the latest post-convergence determination information output from the convergence determining unit 14.

When the stop determining unit 15 determines to terminate the machining under the initial machining condition being tried before the provisional evaluation value converges ("YES" in step ST6), the evaluation determining unit 16 causes the actual machining commanding unit 112 to end the machining in accordance with the initial machining condition for the machining apparatus 2. Specifically, the evaluation determining unit 16 outputs a machining end instruction to the actual machining commanding unit 112. When the machining end instruction is output from the evaluation determining unit 16, the actual machining commanding unit 112 ends machining in accordance with the initial machining condition generated in step ST1, which is currently performed on the machining apparatus 2. Further, the evaluation determining unit 16 determines the estimated convergence value estimated by the convergence determining unit 14 as the evaluation value of the machining performed in accordance with the initial machining condition. Then, the evaluation determining unit 16 causes the search result storage unit 18E to store the combination of the machining condition and the evaluation value as a search result (step ST8). Specifically, the evaluation determining unit 16 causes the search result storage unit 18E to store a combination of the initial machining condition and the evaluation value, here, the estimated convergence value as a search result.

When the stop determining unit 15 determines not to terminate the machining under the initial machining condition being tried ("NO" in step ST6), the evaluation determining unit 16 determines whether or not the convergence determining unit 14 determines that the provisional evaluation value has converged (step ST7). When the convergence determining unit 14 determines that the provisional evaluation value has not converged ("NO" in step ST7), the operation of the machining condition search device 1 returns to the processing of step ST2. When the convergence determining unit 14 determines that the provisional evaluation value has converged ("YES" in step ST7), the evaluation determining unit 16 determines the convergence value of the provisional evaluation value as the evaluation value. Then, the evaluation determining unit 16 causes the search result storage unit 18E to store the combination of the machining condition and the evaluation value as a search result (step ST8). Specifically, the evaluation determining unit 16 causes the search result storage unit 18E to store a combination of the initial machining condition and the evaluation value, here, the convergence value of the provisional evaluation value, as a search result.

The machining condition calculating unit 111 checks whether or not the initial machining has been completed for all the machining conditions selected as the initial machining conditions (step ST9).

When there is an initial machining condition for which the initial machining has not been completed ("NO" in step ST9), the processing from step ST1 to step ST8 is sequentially performed for the initial machining condition for which the initial machining has not been completed. In the second and subsequent steps ST1, the machining condition calculating unit 111 selects an initial machining condition that has not been selected in the previous step ST1. Thus, the search result storage unit 18E stores a search result in which all initial machining conditions (for example, 10 initial machining conditions) and combinations of evaluation values are associated with each other.

For example, when the initial machining in accordance with 10 initial machining conditions is completed, the prediction unit 171 of the machine learning unit 17 predicts an evaluation value corresponding to an untried machining condition by using the search result (a machining condition and an evaluation value corresponding thereto) stored in the search result storage unit 18E, in other words, on the basis of the evaluation value determined by the evaluation determining unit 16 and the machining condition corresponding to the evaluation value (step ST10). With respect to the tried machining condition on which machining has been performed, an evaluation value is determined in step ST8 described above. On the other hand, the machining conditions under which machining is performed are a part of the combinations of all machining conditions. For example, when there are 100000 combinations of machining conditions and 10 initial machining conditions are generated, there are 99990 untried machining conditions after the end of the initial machining. Therefore, in this case, the prediction unit 171 calculates 99990 prediction values of the evaluation values. Note that, as described later, also in steps ST15 to ST22, selection of a machining condition, execution of machining, collection of a machining result, calculation of a provisional evaluation value, prediction of a convergence value of the provisional evaluation value, determination of whether or not to terminate machining before convergence of the provisional evaluation value, and determination of the evaluation value are performed, and processing in step ST10 is performed after processing in step ST22. When step ST10 is performed via the processing of steps ST15 to ST22, the machining conditions set in step ST15 are excluded from the untried machining conditions.

As a method by which the prediction unit 171 calculates a prediction value of an evaluation value corresponding to an untried machining condition, that is, as an example of a method of predicting an evaluation value corresponding to an untried machining condition, there is a method using Gaussian process regression. When the prediction unit 171 predicts the evaluation value corresponding to an untried machining condition using the Gaussian process regression, the following calculation is performed. The method using the Gaussian process regression is an example of a method using a probability model for the machining condition of the evaluation value, which is generated on the assumption that the evaluation value for the machining condition is a random variable following a specific distribution. Assuming that the number of observation values, that is, the number of machining conditions under which machining is performed and evaluation values are calculated is N, the gram matrix is $C_N$, and values of the control parameters in the machining conditions stored in the search result storage unit 18E are $x_1$ to $x_N$, a prediction value $m(x_{N+1})$ of the evaluation value for an untried machining condition $x_{N+1}$ can be calculated by Expression (1) below. As illustrated in Expression (2) below, k is a vector in which values of kernel functions when each of the found machining conditions $x_1, \ldots,$ and $x_N$ and $x_{N+1}$ are used as arguments are arranged. Note that a superscript T represents transposition, and a superscript −1 represents an inverse matrix.

$$m(x_{N+1}) = k^T \cdot \left(C_{N}^{-1}\right) \cdot t \tag{1}$$

$$k = \begin{pmatrix} \text{kernel}(x_1, x_{N+1}) \\ \vdots \\ \text{kernel}(x_N, x_{N+1}) \end{pmatrix} \tag{2}$$

Note that, here, an example has been described in which the prediction unit 171 performs prediction using the Gaussian process regression, but the method of predicting the evaluation value used by the prediction unit 171 is not limited thereto. For example, the prediction unit 171 may predict the evaluation value using supervised learning such as a decision tree, linear regression, boosting, or a neural network.

When predicting an evaluation value corresponding to an untried machining condition, the prediction unit 171 stores a prediction value of the evaluation value (step ST11). Specifically, the prediction unit 171 causes the prediction result storage unit 18F to store prediction result information in which the prediction value of the evaluation value predicted in step ST10 and the machining condition are associated with each other.

Further, the uncertainty evaluating unit 172 of the machine learning unit 17 calculates an index indicating uncertainty with respect to prediction of the evaluation value corresponding to the untried machining condition using the search result stored in the search result storage unit 18E (step ST12). An example of the index indicating the uncertainty is a standard deviation calculated using the Gaussian process regression which is an example of a probability model. In a case where the uncertainty evaluating unit 172 derives an index indicating the uncertainty by using the Gaussian process regression, for example, the following calculation is performed. The number of observation values, that is, the number of machining conditions under which machining has been performed and evaluation values have been calculated is denoted by N, the gram matrix is denoted by $C_N$, a vector obtained by arranging the machining conditions stored in the search result storage unit 18E is denoted by k, and a scalar value obtained by adding an accuracy parameter of a prediction model to values of the kernels of the untried machining conditions $x_{N+1}$ is denoted by c. At this time, when one of the control parameters constituting the machining conditions is $x_i$ (i is a natural number) and the values of the control parameters in the machining conditions stored in the search result storage unit 18E are $x_1$ to $x_N$, a standard deviation $\sigma(x_{N+1})$, which is an index indicating uncertainty with respect to prediction of an evaluation value for an untried machining condition $x_{N+1}$, can be calculated by Expression (3) below. Note that, in Expression (3), a variance $\sigma^2(x_{N+1})$ is obtained, but a standard deviation $\sigma(x_{N+1})$ can be obtained by calculating the square root of the variance.

$$\sigma^2(x_{N+1})=c-k^T\cdot(C_N^{-1})\cdot k \quad (3)$$

Note that, here, an example has been described in which the uncertainty evaluating unit 172 calculates the index indicating the uncertainty with respect to the prediction using the Gaussian process regression, but the method of calculating the index indicating the uncertainty is not limited thereto. For example, the uncertainty evaluating unit 172 may calculate the index using a method such as density estimation or a mixed density network.

Here, the prediction value of the evaluation value and the uncertainty of the prediction value in the first embodiment will be described.

Figure 5:
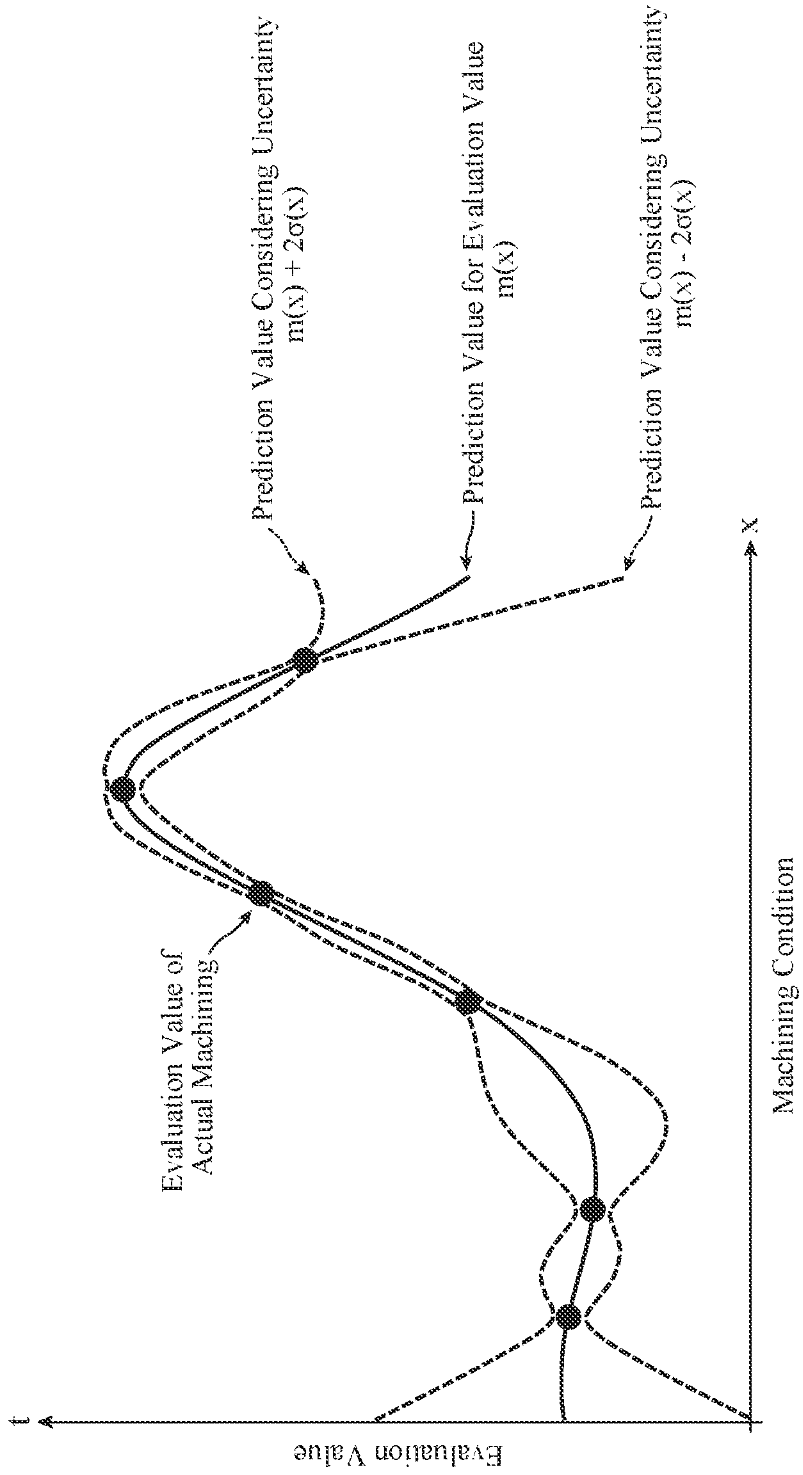
FIG. 5 is a graph conceptually illustrating a relationship between a prediction value of an evaluation value and an index indicating uncertainty in the first embodiment.

FIG. 5 is a graph conceptually illustrating a relationship between a prediction value of an evaluation value and an index indicating uncertainty in the first embodiment.

FIG. 5 illustrates an example in which a prediction value and an index indicating uncertainty are calculated using the Gaussian process regression. The horizontal axis in FIG. 5 represents the value x of the control parameter that is the machining condition, and the vertical axis in FIG. 5 represents the evaluation value. Points indicated by black circles in FIG. 5 indicate evaluation values (hereinafter also referred to as an evaluation value of actual machining) calculated based on actual machining using the initial machining conditions. In the prediction using the Gaussian process regression, the evaluation value is predicted assuming that the evaluation value follows a Gaussian distribution. Thus, when the prediction value of the evaluation value is an average m(x) of the Gaussian distribution and the index indicating the uncertainty of the prediction is a standard deviation σ(x) of the Gaussian distribution, it is statistically indicated that the actual evaluation value falls within a range of m(x)−2σ(x) or more and m(x)+2σ(x) or less with a probability of about 95%. In FIG. 5, a curve indicated by a solid line indicates m(x) which is a prediction value of the evaluation value. Further, in FIG. 5, curves indicated by broken lines indicate a curve of m(x)−2σ(x) and m(x)+2σ(x).

As illustrated in FIG. 5, the index indicating the uncertainty decreases at a position close to the evaluation value of the actual machining, and the index indicating the uncertainty increases at a position away from the evaluation value of the actual machining.

The description returns to the operation of the machining condition search device 1 illustrated in the flowchart of FIG. 2.

The uncertainty evaluating unit 172 stores an index indicating the uncertainty of the prediction value (step ST13). Specifically, the uncertainty evaluating unit 172 causes the uncertainty storage unit 18G to store uncertainty information in which the calculated value of the index is associated with the machining condition.

The search end determining unit 113 of the search machining condition generating unit 11 determines whether or not to end the search for the machining condition using the prediction value of the evaluation value of the machining condition stored in the prediction result storage unit 18F and the index indicating the uncertainty of the prediction value of the evaluation value stored in the uncertainty storage unit 18G (step ST14). For example, the search end determining unit 113 compares a value of an index indicating the uncertainty of the prediction of the evaluation values of all the machining conditions found so far stored in the uncertainty storage unit 18G with a threshold, and determines that the optimal machining condition has been found when the value of the index is equal to or less than the threshold, and ends the search for machining condition.

For example, by using a machining condition x, the prediction value m(x) of the evaluation value for the machining condition x, and the index (standard deviation) σ(x) indicating the uncertainty of the prediction of the evaluation value, the search end determining unit 113 can determine that the larger the value of m(x)+κσ(x), the higher the value of the machining condition is to be searched for. Note that κ is a parameter determined before searching for a machining condition. As the value of κ is smaller, a machining condition having a higher prediction value of the evaluation value is selected, and as the value of κ is larger, a machining condition having a higher possibility of greatly deviating from the prediction of the evaluation value is selected. The same value may be continuously used as the value of κ, or the value may be changed in the middle.

When it is determined to end the search for machining condition ("YES" in step ST14), the search end determining unit 113 determines, as the optimal machining condition, the machining condition associated with the highest evaluation value among the evaluation values of all the machining conditions stored in the search result storage unit 18E. For example, the search end determining unit 113 extracts an optimal machining condition and outputs the extracted machining condition to the actual machining commanding unit 112. The actual machining commanding unit 112 outputs a command including the machining conditions output from the search end determining unit 113 to the machining apparatus 2, and sets the machining conditions in the machining apparatus 2. Thus, the actual machining commanding unit 112 causes the machining apparatus 2 to perform normal machining in accordance with the set machining conditions. Note that this is merely an example, and for example, the search end determining unit 113 may store the determined optimal machining condition in a storage unit (not illustrated).

When it is determined that the search for the machining condition is not to be ended, in other words, when it is determined that it is necessary to additionally search for the machining condition ("NO" in step ST14), the search end determining unit 113 instructs the machining condition calculating unit 111 to generate a machining condition to be tried next.

When instructed by the search end determining unit 113 to generate a machining condition to be tried next, the machining condition calculating unit 111 generates a machining condition to be tried next by using the prediction value of the evaluation value of the machining condition stored in the prediction result storage unit 18F (step ST15). Specifically, the machining condition calculating unit 111 selects a machining condition to be tried next, that is, a new machining condition, from among all machining conditions. The machining condition to be tried next generated by the machining condition calculating unit 111 is output to the actual machining commanding unit 112.

The actual machining commanding unit 112 outputs the command including the machining condition to be tried next generated by the machining condition calculating unit 111 in step ST15 to the machining apparatus 2, and causes the machining apparatus 2 to perform machining under the machining condition (step ST16). During machining by the machining apparatus 2, the machining result collecting unit 12 collects machining result information (step ST17). The evaluation value acquiring unit 13 calculates a provisional evaluation value for the machining performed in step ST16 (step ST18). The convergence determining unit 14 determines whether the provisional evaluation value has converged and estimates the estimated convergence value on the basis of the degree of variation in the provisional evaluation values in time series (step ST19). The stop determining unit 15 determines whether or not to terminate machining under the machining condition being tried (step ST20). The evaluation determining unit 16 determines the estimated convergence value as the evaluation value when the stop determining unit 15 determines to terminate machining under the machining condition being tried, and determines the convergence value of the provisional evaluation value as the evaluation value after the convergence determining unit 14 determines that the provisional evaluation value has converged when the stop determining unit 15 determines not to terminate machining under the machining condition being tried (step ST21). Then, the evaluation determining unit 16 causes a search result to be stored (step ST22). Next, the machining proceeds to the processing of steps ST10 and ST12, and the above-described processing is executed.

The display unit 3 displays information obtained in the course of the above-described processing, optimal machining conditions obtained as results of the processing, and the like. For example, the display unit 3 displays the machining condition and the evaluation value corresponding to the machining condition obtained during the search for the machining condition by the machining condition search device 1. Further, the display unit 3 displays a machining condition and a prediction value of an evaluation value corresponding to the machining condition. Furthermore, the display unit 3 displays the optimal machining condition as a search result. That is, the display unit 3 displays at least one of the machining condition read from the search result storage unit 18E and the evaluation value corresponding to the machining condition, the machining condition read from the prediction result storage unit 18F and the prediction value of the evaluation value corresponding to the machining condition, or the optimal machining condition of the search result output from the machining condition calculating unit 111. Thus, the user can recognize the search situation and the search result of the machining condition by referring to the information displayed on the display unit 3.

As described above, the machining condition search device 1 calculates a provisional evaluation value for the performed machining on the basis of the machining result information collected by causing the machining apparatus 2 to perform machining in accordance with the generated machining condition. The machining condition search device 1 determines whether or not the provisional evaluation value has converged on the basis of the calculated provisional evaluation values in time series, and when it is determined that the provisional evaluation value has not converged, it is determined whether or not to terminate machining under the machining condition being tried before the provisional evaluation value converges. For example, when it is determined that a high evaluation value cannot be obtained even when machining is continued as it is, in other words, when it is determined that the obtained evaluation value is low, the machining condition search device 1 determines to terminate the machining under the machining condition being tried before the provisional evaluation value converges, by comparing the degree of variation (for example, a quartile range of the provisional evaluation values or a distribution of the provisional evaluation values) of the provisional evaluation values in time series with the termination threshold. When the obtained evaluation value is low, the evaluation value is assumed to be an evaluation value having no influence on the search for the optimal machining condition. When the machining under the machining condition being tried is terminated before the provisional evaluation value converges, the machining condition search device 1 sets the estimated convergence value as the evaluation value corresponding to the machining condition being tried. When predicting the prediction value of the evaluation value, the machining condition search device 1 determines whether or not to end the search for the machining condition, and when ending the search for the machining condition, the machining condition search device 1 determines an optimal machining condition on the basis of the determined evaluation value, and when not ending the search for the machining condition, the machining condition search device 1 generates a machining condition to be tried next. The machining condition search device 1 repeats the above-described processing until it is determined to end the search for the machining condition. Thus, the machining condition search device 1 determines the optimal machining condition.

In the conventional optimal machining condition search technique, the machining apparatus 2 is caused to perform machining for a certain period of time until the vibrational change in the machining result is settled for each of all the machining conditions to be tried, and the evaluation value corresponding to the machining condition is calculated after the vibrational change in the machining result is settled. Therefore, the conventional search technique for the optimal machining condition has poor time efficiency until the optimal machining condition can be found.

On the other hand, as described above, in the machining condition search device 1 according to the first embodiment, when it is determined that a high evaluation value cannot be obtained even when machining is continued as it is in calculating the evaluation value, machining under the machining condition being tried is terminated before the evaluation value (provisional evaluation value) converges, and the estimated convergence value is set as the evaluation value corresponding to the machining condition being tried. Thus, as to the machining under a certain machining condition for which it is determined that a high evaluation value cannot be obtained, the machining condition search device 1 can omit the time from the time point at which the machining is terminated until the machining result converges from the time period during which the machining result for the machining converges. That is, the machining condition search device 1 can shorten the total time necessary to search for the optimal machining condition by the omitted time.

Figure 6A:
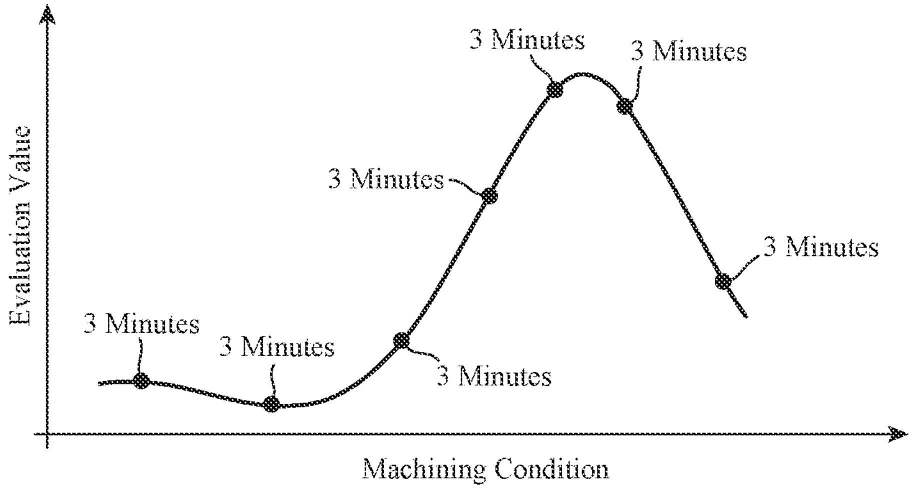
FIGS. 6A and 6B are graphs illustrating an example of a result of comparing a time until an optimal machining condition is found in a conventional optimal machining condition search technique with a time until an optimal machining condition is found by the machining condition search device according to the first embodiment.
Figure 6B:
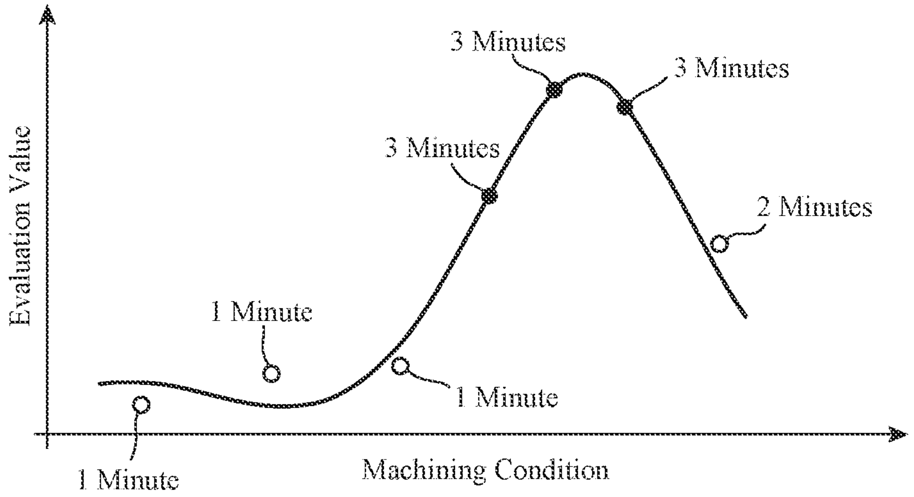

FIGS. 6A and 6B are graphs illustrating an example of a result of comparing the time until the optimal machining condition is found in the conventional search technique for the optimal machining condition with the time until the optimal machining condition is found by the machining condition search device 1 according to the first embodiment.

FIG. 6A is a graph illustrating evaluation values until an optimal machining condition is found in the conventional search technique for the optimal machining condition, and FIG. 6B is a graph illustrating evaluation values until an optimal machining condition is found by the machining condition search device 1 according to the first embodiment.

In FIGS. 6A and 6B, black circles indicate evaluation values calculated on the basis of machining results of actual machining performed until the machining results converge. In FIG. 6B, points indicated by white circles indicate estimated convergence values calculated on the basis of machining results of actual machining that is terminated before the machining results converge.

Note that FIGS. 6A and 6B are results obtained by searching the same machining apparatus 2 for optimal machining conditions under which the same desired machining result can be obtained.

In the conventional search technique for the optimal machining condition, as illustrated in FIG. 6A, machining is continued until the machining result, in other words, the evaluation value converges regardless of whether the evaluation value is good or bad, and thus it takes time until the optimal machining condition is found. In the example illustrated in FIG. 6A, it takes 21 minutes to find the optimal machining condition.

On the other hand, in the machining condition search device 1 according to the first embodiment, as illustrated in FIG. 6B, the machining is terminated when the machining result, in other words, the evaluation value is expected to be low, so that the optimal machining condition can be found in a short time. In the example illustrated in FIG. 6B, the optimal machining condition is found in 14 minutes. The time needed until the optimal machining condition is found by the machining condition search device 1 according to the first embodiment is shortened by 7 minutes as compared with the time needed until the optimal machining condition is found by the conventional search technique for the optimal machining condition illustrated in FIG. 6A.

Note that, in the first embodiment described above, in the machining condition search device 1, the termination threshold used when the stop determining unit 15 determines whether or not to terminate machining under the machining condition being tried before the provisional evaluation value converges is the reference evaluation value specified by the user in advance. That is, the termination threshold is a fixed value. Then, the stop determining unit 15 determines whether or not to terminate the machining under the machining condition being tried before the provisional evaluation value converges by comparing the degree of variation of the provisional evaluation values in time series with the termination threshold. However, this is merely an example.

For example, the stop determining unit 15 can also set the termination threshold on the basis of a tried machining condition and the evaluation value corresponding to the machining condition. The tried machining condition and the evaluation value corresponding to the machining condition are stored in the search result storage unit 18E by the evaluation determining unit 16 as search results. The termination threshold set on the basis of the evaluation value determined by the stop determining unit 15 is also referred to as a "variable termination threshold". Note that, in this case, when the variable termination threshold is set, the stop determining unit 15 determines whether or not to terminate the machining under the machining condition being tried before the provisional evaluation value converges, for example, by comparing the estimated convergence value estimated by the convergence determining unit 14 with the variable termination threshold. The estimated convergence value estimated by the convergence determining unit 14 is an estimated convergence value in the latest post-convergence determination information stored in the convergence result storage unit 18C.

Specifically, the stop determining unit 15 sets the variable termination threshold in accordance with a preset condition (hereinafter referred to as a "variable termination threshold setting condition") on the basis of, for example, a tried machining condition and an evaluation value corresponding to the machining condition.

As the variable termination threshold setting condition, for example, a condition such as <Condition (1)>, <Condition (2)>, or <Condition (3)> below is set.

<Condition (1)>

When the number of times of trial is less than X times, a value for not terminating machining is set as a variable termination threshold, and when the number of times of trial is equal to or more than X times, an X-th evaluation value among the evaluation values corresponding to all the tried machining conditions is set as a variable termination threshold.

<Condition (2)>

An evaluation value of higher y order among evaluation values corresponding to all tried machining conditions is set as a variable termination threshold <Condition (3)>

The lowest evaluation value among the evaluation values of higher Z % among evaluation values corresponding to all tried machining conditions is set as a variable termination threshold.

Note that the value of X, Y, or Z in <Condition (1)>, <Condition (2)>, or <Condition (3)> can be set as appropriate.

Further, in <Condition (1)>, the "value for not terminating machining" is, for example, "0". Note that this is merely an example, and it is only necessary that a value that does not exceed an estimated convergence value that can be assumed is set as the "value for not terminating machining".

Figure 7:
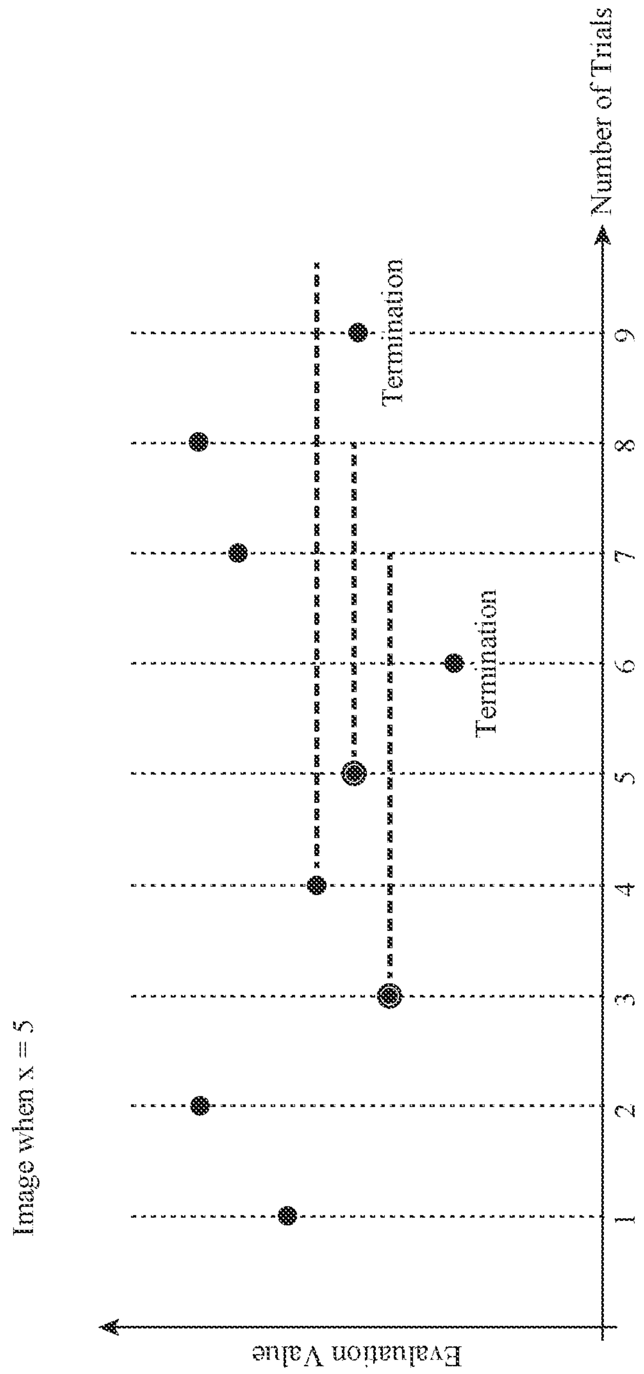
FIG. 7 is a diagram for describing an example of a method in which the stop determining unit sets a variable termination threshold on the basis of a tried machining condition and an evaluation value corresponding to the machining condition in the first embodiment.

Here, FIG. 7 is a diagram for describing an example of a method in which the stop determining unit 15 sets a variable termination threshold based on a tried machining condition and an evaluation value corresponding to the machining condition in the first embodiment.

FIG. 7 is a diagram for describing an example of a method of setting a variable termination threshold when the stop determining unit 15 sets the variable termination threshold in accordance with the variable termination threshold setting condition of <Condition (1)> described above on the basis of a tried machining condition and an evaluation value corresponding to the machining condition. In FIG. 7, as an example, X in <Condition (1)> is set to “5”.

The horizontal axis in FIG. 7 indicates the number of times of trial of the machining condition. The number of trials is, that is, the number of machining conditions that have been tried. In FIG. 7, the vertical axis represents the evaluation value corresponding to each machining condition. Note that, when the machining condition is being tried, the evaluation value on the vertical axis in FIG. 7 is an estimated convergence value. In FIG. 7, points indicated by black circles are an evaluation value or an estimated convergence value each corresponding to the machining conditions.

For convenience of explanation, in FIG. 7, it is assumed that the machining condition is tried nine times, but for example, it is assumed that the sixth machining condition is currently being tried. That is, in this case, in FIG. 7, the evaluation value corresponding to the sixth trial is the estimated convergence value.

In this case, according to FIG. 7, when the five trials are ended, the fifth evaluation value among the evaluation values corresponding to the machining conditions that have been tried five times is the evaluation value corresponding to the machining condition that has been tried for the third time. Accordingly, the stop determining unit 15 sets the evaluation value corresponding to the machining condition tried for the third time as the variable termination threshold. Note that, since the machining condition being tried, in other words, the estimated convergence value for the machining condition being tried for the sixth time is less than the variable termination threshold, the stop determining unit 15 determines to terminate the machining under the machining condition being tried.

Further, for example, it is assumed that the ninth machining condition is currently being tried. That is, in this case, in FIG. 7, the evaluation value corresponding to the ninth trial is the estimated convergence value.

In this case, according to FIG. 7, at the end of eight trials, the fifth evaluation value among the evaluation values corresponding to the machining conditions that have been tried eight times is the evaluation value corresponding to the machining condition that has been tried for the fourth time. Therefore, the stop determining unit 15 sets the evaluation value corresponding to the machining condition tried for the fourth time as the variable termination threshold. Note that, since the machining condition being tried, in other words, the estimated convergence value for the machining condition being tried for the ninth time is less than the variable termination threshold, the stop determining unit 15 determines to terminate the machining under the machining condition being tried.

In this manner, the stop determining unit 15 can change the criterion used when it is determined whether or not to terminate machining under the machining condition being tried before the provisional evaluation value converges, in other words, the termination threshold.

For example, when the termination threshold is too high, the machining condition search device 1 may terminate the machining condition of the machining that needs to wait for convergence of the machining result in the middle, and a deviation of the prediction value of the predicted evaluation value may increase. Consequently, there is a possibility that the machining condition search device 1 cannot search for the optimal machining condition. Conversely, for example, in a case where the termination threshold is too low, the machining condition search device 1 may take time to determine that machining under the machining condition corresponding to the evaluation value that is not high is terminated before the provisional evaluation value converges, or may wait without terminating the machining until the provisional evaluation value converges. Consequently, the machining condition search device 1 may take time to find the optimal machining condition.

In the machining condition search device 1, the stop determining unit 15 can change the termination threshold, so that the machining condition search device 1 can shorten the time until the optimal machining condition can be found while maintaining the possibility of being able to find the optimal machining condition.

Note that, in this case, for the operation of the machining condition search device 1 described with reference to the flowchart of FIG. 2, a step in which the stop determining unit 15 performs processing of setting the variable termination threshold is added between step ST5 and step ST6 and between step ST19 and step ST20.

A hardware configuration for implementing the functions of the machining condition search device 1 is as follows.

The functions of the search machining condition generating unit 11, the machining result collecting unit 12, the evaluation value acquiring unit 13, the convergence determining unit 14, the stop determining unit 15, the evaluation determining unit 16, and the machine learning unit 17 in the machining condition search device 1 are implemented by a processing circuit. That is, the machining condition search device 1 includes a processing circuit that executes processing from step ST1 to step ST22 in FIG. 2. The processing circuit may be dedicated hardware or a central processing unit (CPU) that executes a program stored in a memory.

Figure 8A:
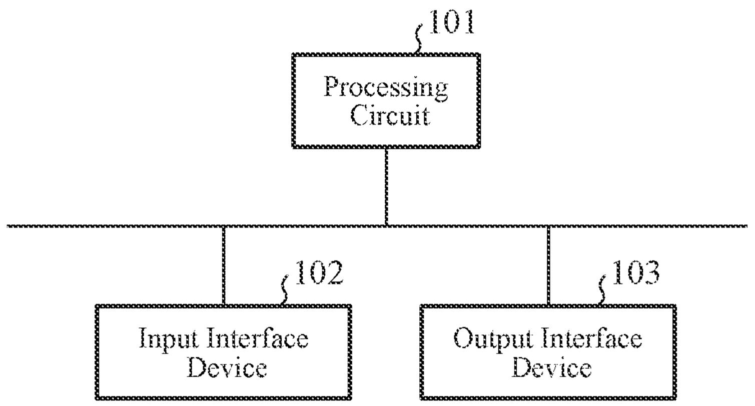
FIGS. 8A and 8B are diagrams illustrating an example of a hardware configuration of the machining condition search device according to the first embodiment.
Figure 8B:
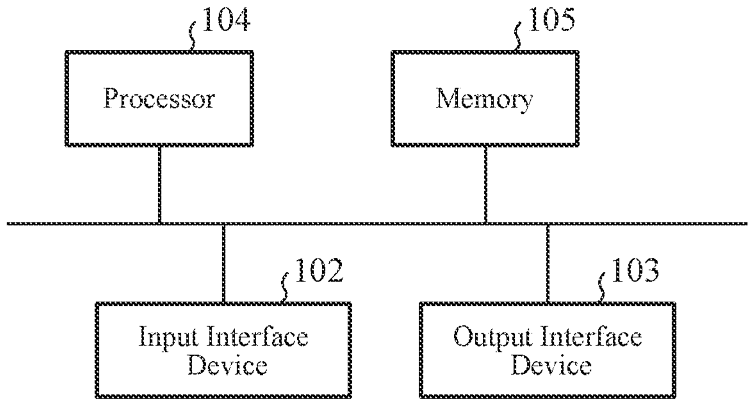

FIG. 8A is a block diagram illustrating a hardware configuration that implements the functions of the machining condition search device 1. Further, FIG. 8B is a block diagram illustrating a hardware configuration for executing software for implementing the functions of the machining condition search device 1. In FIGS. 8A and 8B, an input interface device 102 relays the machining result information output from the machining apparatus 2 to the machining condition search device 1, and relays the stored information output from the storage units 18A to 18G to the machining condition search device 1. An output interface device 103 relays information output from the machining condition search device 1 to the display unit 3 or information output from the machining condition search device 1 to the storage units 18A to 18G.

In a case where the processing circuit is the processing circuit 101 of dedicated hardware illustrated in FIG. 8A, the processing circuit 101 corresponds to, for example, a single circuit, a composite circuit, a programmed processor, a parallel programmed processor, an application specific integrated circuit (ASIC), a field-programmable gate array (FPGA), or a combination thereof. The functions of the search machining condition generating unit 11, the machining result collecting unit 12, the evaluation value acquiring unit 13, the convergence determining unit 14, the stop determining unit 15, the evaluation determining unit 16, and the machine learning unit 17 in the machining condition search device 1 may be implemented by separate processing circuits, or these functions may be collectively implemented by one processing circuit.

When the processing circuit is a processor 104 illustrated in FIG. 8B, the functions of the search machining condition generating unit 11, the machining result collecting unit 12, the evaluation value acquiring unit 13, the convergence determining unit 14, the stop determining unit 15, the evaluation determining unit 16, and the machine learning unit 17 in the machining condition search device 1 are implemented by software, firmware, or a combination of software and firmware. Note that software or firmware is described as a program and stored in a memory 105.

The processor 104 reads and executes the program stored in the memory 105 to implement the functions of the search machining condition generating unit 11, the machining result collecting unit 12, the evaluation value acquiring unit 13, the convergence determining unit 14, the stop determining unit 15, the evaluation determining unit 16, and the machine learning unit 17 in the machining condition search device 1. For example, the machining condition search device 1 includes the memory 105 for storing a program that results in execution of the processing from step ST1 to step ST22 in the flowchart illustrated in FIG. 2 when executed by the processor 104. These programs cause a computer to execute a processing procedure or method performed by the search machining condition generating unit 11, the machining result collecting unit 12, the evaluation value acquiring unit 13, the convergence determining unit 14, the stop determining unit 15, the evaluation determining unit 16, and the machine learning unit 17. The memory 105 may be a computer-readable storage medium storing a program for causing a computer to function as the search machining condition generating unit 11, the machining result collecting unit 12, the evaluation value acquiring unit 13, the convergence determining unit 14, the stop determining unit 15, the evaluation determining unit 16, and the machine learning unit 17.

The memory 105 corresponds to, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, or a DVD.

Some of the functions of the search machining condition generating unit 11, the machining result collecting unit 12, the evaluation value acquiring unit 13, the convergence determining unit 14, the stop determining unit 15, the evaluation determining unit 16, and the machine learning unit 17 in the machining condition search device 1 may be implemented by dedicated hardware, and some of the functions may be implemented by software or firmware. For example, the functions of the search machining condition generating unit 11, the machining result collecting unit 12, the evaluation value acquiring unit 13, the convergence determining unit 14, the stop determining unit 15, and the evaluation determining unit 16 are implemented by the processing circuit 101 that is dedicated hardware, and the functions of the machine learning unit 17 are implemented by the processor 104 reading and executing a program stored in the memory 105. As described above, the processing circuit can implement the above-described functions by hardware, software, firmware, or a combination thereof.

Further, in the first embodiment described above, the machining condition search device 1 may be mounted on the machining apparatus 2, or may be provided in a server connected to the machining apparatus 2 via a network, for example. For example, some of the search machining condition generating unit 11, the machining result collecting unit 12, the evaluation value acquiring unit 13, the convergence determining unit 14, the stop determining unit 15, the evaluation determining unit 16, and the machine learning unit 17 may be mounted on the machining apparatus 2, and the others may be provided in the server.

As described above, the machining condition search device 1 according to the first embodiment includes the machining condition calculating unit 111 to generate a machining condition including a plurality of control parameters settable in the machining apparatus 2, the actual machining commanding unit 112 to cause the machining apparatus 2 to perform machining in accordance with the machining condition generated by the machining condition calculating unit 111, the machining result collecting unit 12 to collect machining result information indicating a machining result of the machining performed by the machining apparatus 2 by the actual machining commanding unit 112, the evaluation value acquiring unit 13 to calculate a provisional evaluation value for the performed machining on the basis of the machining result information collected by the machining result collecting unit 12, and the convergence determining unit 14 to determine whether or not the provisional evaluation value has converged on the basis of the provisional evaluation values in time series calculated by the evaluation value acquiring unit 13, and estimate an estimated convergence value to be a convergence destination of the provisional evaluation value when it is determined that the provisional evaluation value has not converged, the stop determining unit 15 to determine whether or not to terminate the machining under the machining condition being tried before the provisional evaluation value converges when the convergence determining unit 14 determines that the provisional evaluation value has not converged, the evaluation determining unit 16, when the stop determining unit 15 determines to terminate the machining under the machining condition being tried, to cause the actual machining commanding unit 112 to end the machining in accordance with the machining condition for the machining apparatus 2 and determine the estimated convergence value estimated by the convergence determining unit 14 as an evaluation value of the machining performed in accordance with the machining condition, and determine, when the stop determining unit 15 determines not to terminate the machining under the machining condition being tried, a convergence value of the provisional evaluation value as the evaluation value after the convergence determining unit 14 determines that the provisional evaluation value has converged, the search end determining unit 113 to determine whether or not to end a search for the machining condition, determine the machining condition that is optimum on the basis of the evaluation value determined by the evaluation determining unit 16 when ending the search, and cause the machining condition calculating unit 111 to generate the machining condition to be tried next on the basis of the prediction value predicted by the prediction unit 171 when not ending the search, in which until the search end determining unit 113 determines to end the search, each of processes by the machining condition calculating unit 111, the actual machining commanding unit 112, the machining result collecting unit 12, the evaluation value acquiring unit 13, the convergence determining unit 14, the stop determining unit 15, the evaluation determining unit 16, the prediction unit 171, and the search end determining unit 113 is repeatedly performed. Thus, when searching for the optimal machining conditions, the machining condition search device 1 can shorten the time until the optimal machining conditions can be found, as compared with the conventional technology in which machining under the machining conditions is performed until the vibratory change in the machining result is settled for the machining apparatus 2 for all the machining conditions to be tried.

Note that any component of the embodiment can be modified or any component of the embodiment can be omitted.

INDUSTRIAL APPLICABILITY

A machining condition search device according to the present disclosure can be used to search for machining conditions of a laser machining apparatus, for example.

REFERENCE SIGNS LIST

1: machining condition search device, 2: machining apparatus, 3: display unit, 11: search machining condition generating unit, 111: machining condition calculating unit, 112: actual machining commanding unit, 113: search end determining unit, 12: machining result collecting unit, 13: evaluation value acquiring unit, 14: convergence determining unit, 15: stop determining unit, 16: evaluation determining unit, 17: machine learning unit, 171: prediction unit, 172: uncertainty evaluating unit, 18A: machining result storage unit, 18B: evaluation value storage unit, 18C: convergence result storage unit, 18D: stop determination storage unit, 18E: search result storage unit, 18F: prediction result storage unit, 18G: uncertainty storage unit, 101: processing circuit, 102: input interface device, 103: output interface device, 104: processor, 105: memory

The invention claimed is:

1. A machining condition search device, comprising:

processing circuitry configured to generate a machining condition including a plurality of control parameters settable in a machining apparatus;

cause the machining apparatus to perform machining in accordance with the generated machining condition;

collect machining result information indicating a machining result of the machining performed by the machining apparatus;

calculate at least one provisional evaluation value for the performed machining on a basis of the collected machining result information, the at least one provisional evaluation value including a plurality of provisional evaluation values;

determine whether or not the at least one provisional evaluation value has converged on a basis of the calculated provisional evaluation values in time series, and estimate an estimated convergence value to be a convergence destination of the at least one provisional evaluation value when it is determined that the at least one provisional evaluation value has not converged;

determine whether or not to terminate the machining under the machining condition being tried before the at least one provisional evaluation value converges when it is determined that the at least one provisional evaluation value has not converged;

end the machining in accordance with the machining condition for the machining apparatus when the processing circuitry determines to terminate the machining under the machining condition being tried and determine the estimated convergence value as an evaluation value of the machining performed in accordance with the machining condition, and determine, when the processing circuitry determines not to terminate the machining under the machining condition being tried, a convergence value of the at least one provisional evaluation value as the evaluation value after the processing circuitry determines that the at least one provisional evaluation value has converged;

predict a prediction value of the evaluation value corresponding to the machining condition untried on a basis of the determined evaluation value and the machining condition corresponding to the evaluation value; and determine whether or not to end a search for the machining condition, determine the machining condition that is optimum on a basis of the determined evaluation value when ending the search, and generate the machining condition to be tried next on a basis of the prediction value when not ending the search, wherein until the processing circuitry determines to end the search, the processing circuitry repeatedly performs each of aforementioned processes.

2. The machining condition search device according to claim 1, wherein the processing circuitry estimates the estimated convergence value on a basis of a degree of variation in the calculated provisional evaluation values in time series.

3. The machining condition search device according to claim 1, wherein the processing circuitry estimates the estimated convergence value on a basis of the calculated provisional evaluation values in time series and a first machine learning model that receives the evaluation values in time series as an input and outputs the estimated convergence value.

4. The machining condition search device according to claim 1, wherein the processing circuitry determines whether or not to terminate the machining under the machining condition being tried before the at least one provisional evaluation value converges by comparing a degree of variation of the calculated provisional evaluation values in time series with a termination threshold.

5. The machining condition search device according to claim 4, wherein the processing circuitry sets a variable termination threshold on a basis of the machining condition that has been tried and the evaluation value corresponding to the machining condition, and determines whether or not to terminate the machining under the machining condition that is being tried before the at least one provisional evaluation value converges by comparing the estimated convergence value with the set variable termination threshold.

6. The machining condition search device according to claim 1, wherein the processing circuitry determines whether or not to terminate the machining under the machining condition being tried before the at least one provisional evaluation value converges on a basis of the calculated provisional evaluation values in time series and a second machine learning model that receives the evaluation values in time series as an input and outputs information indicating whether or not to stop machining.

7. The machining condition search device according to claim 1, wherein the processing circuitry is further configured to calculate an index indicating uncertainty of prediction; and generate the machining condition to be tried next on a basis of the prediction value of the evaluation value and the index indicating prediction uncertainty.

8. The machining condition search device according to claim 7, wherein the processing circuitry determines whether or not to end the search for the machining condition using the prediction value of the evaluation value and the index indicating uncertainty of the evaluation value, and sets the machining condition corresponding to the evaluation value that is highest among the determined evaluation values as the machining condition that is optimal when it is determined to end the search for the machining condition.

9. The machining condition search device according to claim 7, wherein the processing circuitry predicts the prediction value using a probability model for the machining condition of an evaluation value generated on an assumption that the evaluation value for the machining condition is a random variable following a specific distribution, and calculates the index indicating uncertainty of the prediction using the probability model.

10. The machining condition search device according to claim 1, wherein the processing circuitry is further configured to display at least one of the machining condition and the evaluation value corresponding to the machining condition, the machining condition and the prediction value of the evaluation value corresponding to the machining condition, or the machining condition of a search result.

11. A machining condition search method, comprising:

generating a machining condition including a plurality of control parameters settable in a machining apparatus;

causing the machining apparatus to perform machining in accordance with the generated machining condition;

collecting machining result information indicating a machining result of the machining performed by the machining apparatus;

calculating at least one provisional evaluation value for the performed machining on a basis of the collected machining result information, the at least one provisional evaluation value including a plurality of provisional evaluation values;

determining whether or not the at least one provisional evaluation value has converged on a basis of the calculated provisional evaluation values in time series, and estimating an estimated convergence value to be a convergence destination of the at least one provisional evaluation value when it is determined that the at least one provisional evaluation value has not converged;

determining whether or not to terminate the machining under the machining condition being tried before the provisional evaluation value converges when it is determined that the provisional evaluation value has not converged;

ending the machining in accordance with the machining condition for the machining apparatus when determining to terminate the machining under the machining condition being tried and determining the estimated convergence value as an evaluation value of the machining performed in accordance with the machining condition, and determining, when determining not to terminate the machining under the machining condition being tried, a convergence value of the at least one provisional evaluation value as the evaluation value after it is determined that the at least one provisional evaluation value has converged;

predicting a prediction value of the evaluation value corresponding to the machining condition untried on a basis of the determined evaluation value and the machining condition corresponding to the evaluation value; and determining whether or not to end a search for the machining condition, determines the machining condition that is optimum on a basis of the determined evaluation value when ending the search, and generating the machining condition to be tried next on a basis of the prediction value when not ending the search; and repeatedly performing each of aforementioned processes until the it is determined to end the search.

* * * * *